United States Patent
Oakey

(10) Patent No.: US 9,937,865 B1
(45) Date of Patent: Apr. 10, 2018

(54) RUNNING BOARD SYSTEM

(71) Applicant: Douglas Oakey, Hudson, FL (US)

(72) Inventor: Douglas Oakey, Hudson, FL (US)

( * ) Notice: Subject to any disclaimer, the term of this patent is extended or adjusted under 35 U.S.C. 154(b) by 0 days.

(21) Appl. No.: 15/618,486

(22) Filed: Jun. 9, 2017

(51) Int. Cl.
*B62D 25/22* (2006.01)
*B60R 3/00* (2006.01)

(52) U.S. Cl.
CPC ................................. *B60R 3/002* (2013.01)

(58) Field of Classification Search
None
See application file for complete search history.

(56) References Cited

U.S. PATENT DOCUMENTS

| | | | | |
|---|---|---|---|---|
| 7,168,721 B2* | 1/2007 | Mulder | ..................... | B60R 3/00 280/163 |
| 7,334,807 B2* | 2/2008 | Mulder | .................. | B60R 3/002 280/163 |
| 9,676,337 B2* | 6/2017 | Du | ............................. | B60R 3/00 |
| 2005/0263974 A1* | 12/2005 | Mulder | ..................... | B60R 3/00 280/163 |
| 2008/0018074 A1* | 1/2008 | Steffens | ................... | B60R 3/00 280/163 |

\* cited by examiner

*Primary Examiner* — John D Walters
*Assistant Examiner* — Hilary L Johns

(57) ABSTRACT

An upper component has a top and an inner side with a lower free end and has an outer side with a lower free end. A lower component has a bottom and an inner side with an upper free end and has an outer side with an upper free end. The lower free ends are coupled to the upper free ends respectively forming a cylindrical configuration with a chamber there within. A support beam within the chamber extends vertically with an upper end adjacent to the top and a lower end adjacent to the bottom.

1 Claim, 3 Drawing Sheets

RUNNING BOARD SYSTEM

BACKGROUND OF THE INVENTION

Field of the Invention

The present invention relates to a running board system and more particularly pertains to constituting a vehicle platform for standing upon and for providing a stable step into and from a vehicle, the constituting and the providing being done in a safe, secure, eye-appealing, and economical manner.

SUMMARY OF THE INVENTION

In view of the disadvantages inherent in the known types of step systems now present in the prior art, the present invention provides an improved running board system. As such, the general purpose of the present invention, which will be described subsequently in greater detail, is to provide a new and improved running board system and method which has all the advantages of the prior art and none of the disadvantages.

From a broad viewpoint, the present invention is a running board system comprising an upper component and a similarly configured lower component. The upper component has a top and an inner side with a lower free end and has an outer side with a lower free end. The lower component has a bottom and an inner side with an upper free end and has an outer side with an upper free end. The lower free ends are coupled to the upper free ends respectively forming a cylindrical configuration with a chamber there within. A support beam within the chamber extends vertically with an upper end adjacent to the top and a lower end adjacent to the bottom.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved running board system which has all of the advantages of the prior art step systems and none of the disadvantages.

It is another object of the present invention to provide a new and improved running board system which may be easily and efficiently manufactured and marketed.

It is further object of the present invention to provide a new and improved running board system which is of durable and reliable constructions.

An even further object of the present invention is to provide a new and improved running board system which is susceptible of a low cost of manufacture with regard to both materials and labor, and which accordingly is then susceptible of low prices of sale to the consuming public, thereby making such running board system economically available to the buying public.

Lastly, another object of the present invention is to provide a running board system for constituting a vehicle platform for standing upon and for providing a stable step into and from a vehicle, the constituting and the providing being done in a safe, secure, eye-appealing, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
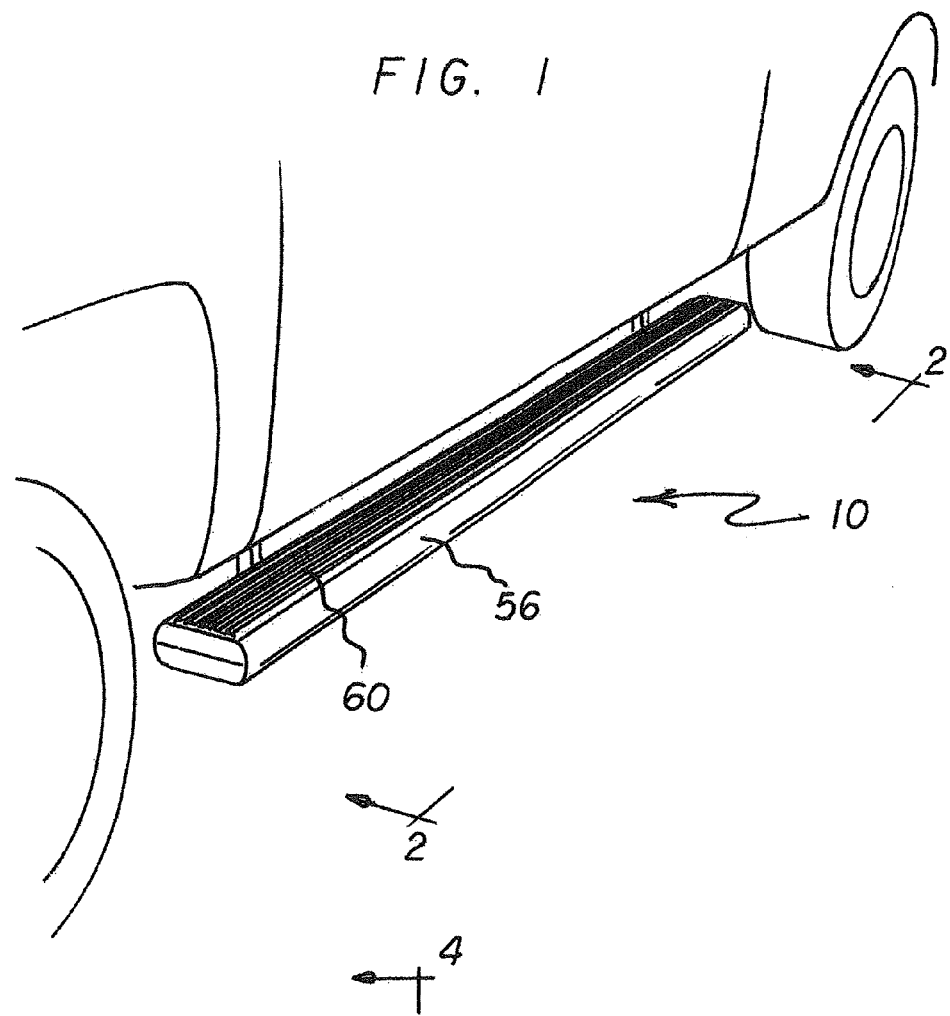
FIG. 1 is a perspective illustration of a running board system constructed in accordance with the principles of the present invention.
Figure 2:
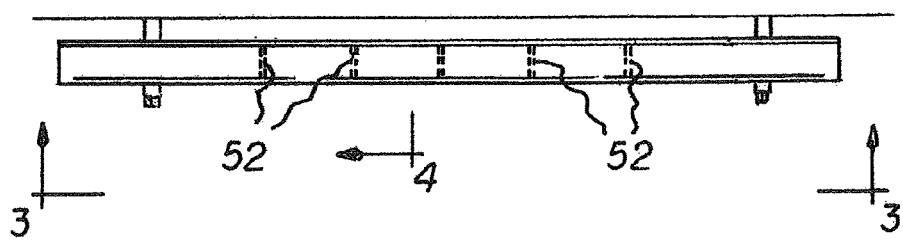
FIG. 2 is aside elevational view taken along line 2-2 of FIG. 1.
Figure 3:
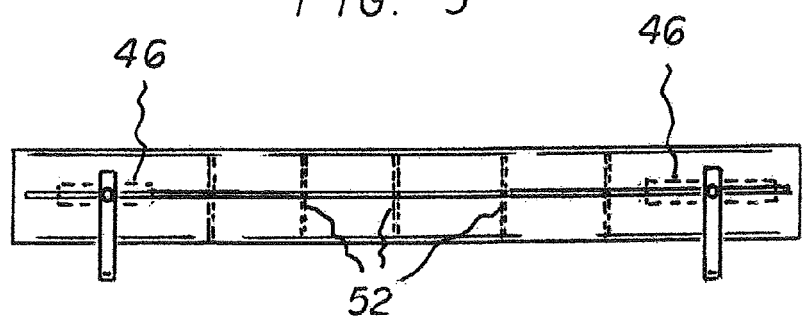
FIG. 3 is a bottom view taken along line 3-3 of FIG. 2.
Figure 4:
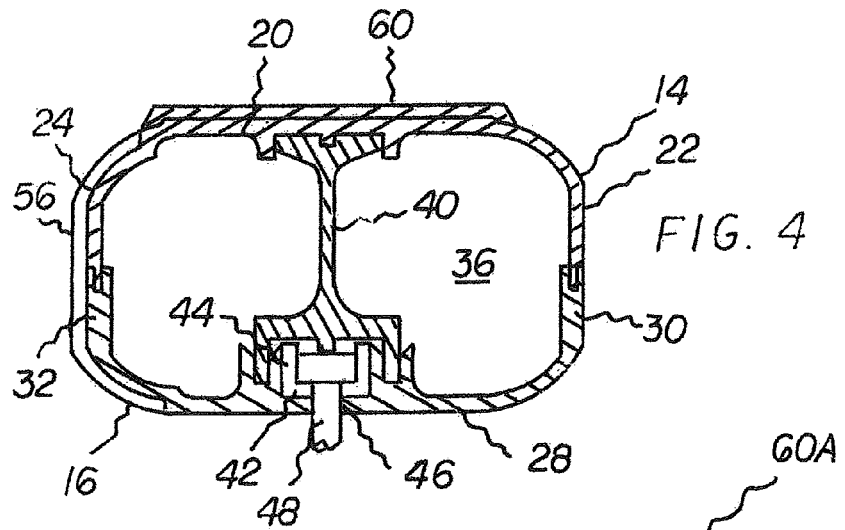
FIG. 4 is a cross sectional view taken along line 4-4 of FIG. 2.
Figure 5:
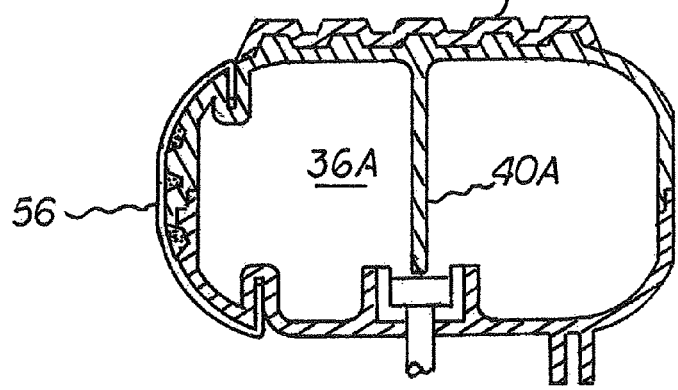
FIG. 5 is cross sectional view similar to FIG. 4 but illustrating an alternate embodiment of the invention.
Figure 6:
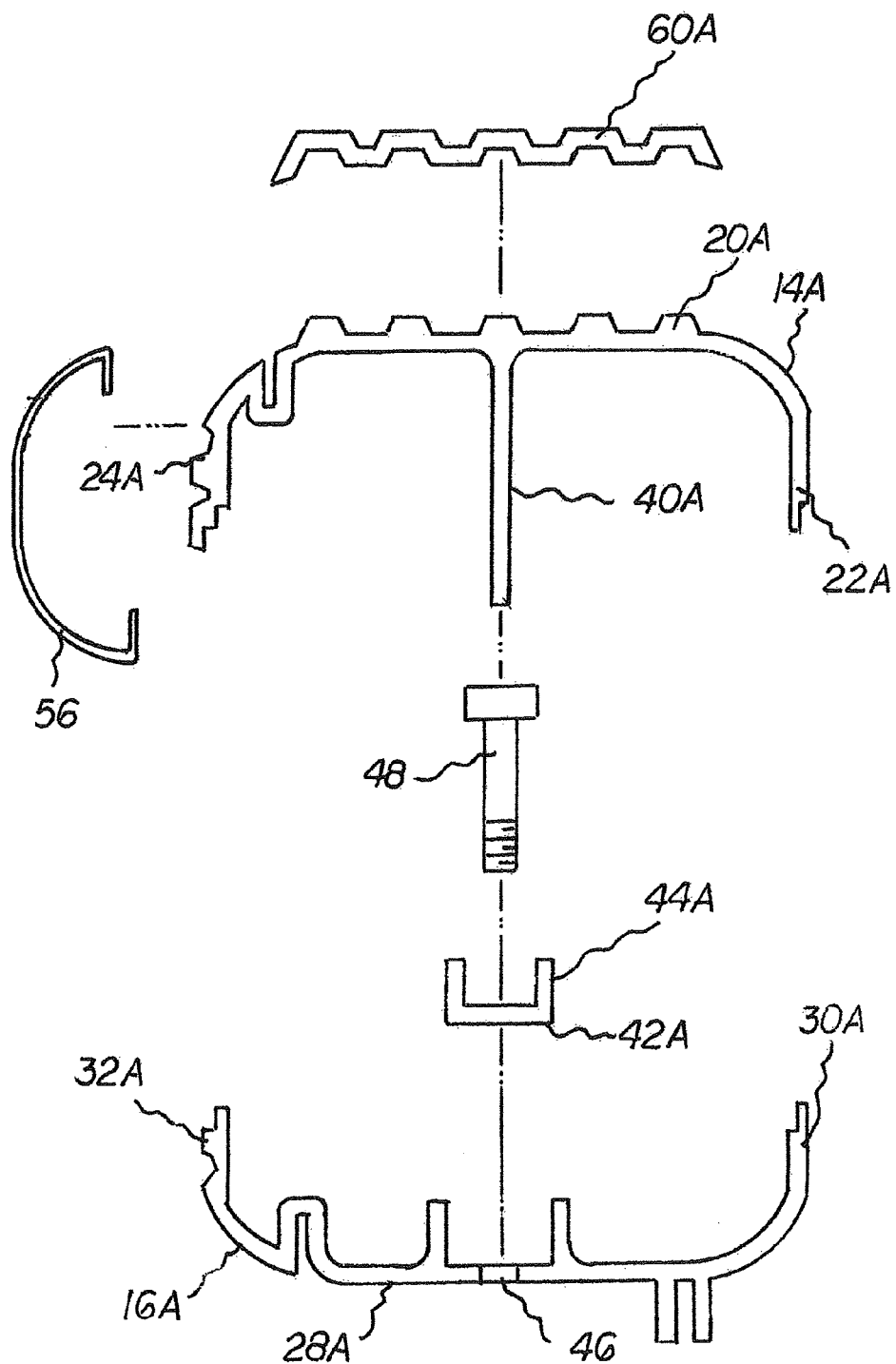
FIG. 6 is an exploded cross sectional view of the system shown in FIG. 5.

With reference now to the drawings, and in particular to FIG. 1 thereof, the preferred embodiment of the new and improved running board system embodying the principles and concepts of the present invention and generally designated by the reference numeral 10 will be described.

The present invention, the running board system 10 is comprised of a plurality of components. Such components in their broadest context include an upper component, a lower component, and a support beam. Such components are individually configured and correlated with respect to each other so as to attain the desired objective.

First provided is an upper component 14, 14A. A similarly configured lower component 16, 16A is provided. The upper component and the lower component have a common height, a common width, and a common length. The common height is from 30 to 40 percent of the common width. The common width is from 15 to 25 percent of the common length.

The upper component has a top 20, 20A. The top is horizontally disposed. The upper component has an inner side 22, 22A. The inner side is vertically disposed. The inner side has a lower free end. The upper component has an outer side 24, 24A. The outer side is vertically disposed. The outer side has a lower free end.

The lower component has a bottom 28, 28A. The bottom is horizontally disposed. The lower component has an inner side 30, 30A. The inner side is vertically disposed. The inner side has an upper free end. The lower component has an outer side 32, 32A. The outer side is vertically disposed. The outer side has an upper free end The lower free end of the inner side of the upper component is coupled to the upper free end of the inner side of the lower component. The lower free end of the outer side of the upper component is coupled to the upper free end of the outer side of the lower component. In this manner, a cylindrical configuration is formed. The cylindrical formation has an exterior surface and an interior surface. A chamber 36, 36A is provided within the cylindrical configuration. The chamber has opposed ends. The opposing ends are separated by the length.

A support beam 40, 40A is provided. The support beam is provided within the chamber. The support beam extends vertically. The support beam extends to the opposed ends of the chamber. The support beam has an upper end. The upper end is adjacent to the top. The support beam has a lower end. The lower end is adjacent to the bottom. The lower end is spaced from the bottom. Two U-shaped channels 42, 42A are provided. The U-shaped channels are provided within the housing. The U-shaped channels extend upwardly from the bottom. The U-shaped channels are adjacent to the opposed ends of the chamber.

Each U-shaped channel has walls 44, 44A. The walls are laterally spaced. A space is formed between the walls. The lower end of the support beam is located within the spaces. Two slots 46, 46A are provided. The slots are provided in the bottom between the walls. Two bolts 48, 48A are provided. The two bolts extend through the two slots respectively. Each bolt has a lower end. Each lower end of each bolt is below the bottom. The lower end of each bolt being below the bottom enables the bolt to be coupled to the vehicle. Each bolt has an upper end. The upper end of each bolt is in a space. In this manner each upper end of each bolt is held in place by the support beam.

A plurality of bulkheads 52 is provided next. The bulkheads are provided within the chamber. The bulkheads are provided between the bolts. The bulkheads contact the top and the bottom. In this manner, added strength is provided to the system. The upper component, the lower component, the support beam, and the U-shaped channel are fabricated of a rigid material.

A decorative panel 56, 56A is provided. The decorative panel is coupled to the outer side of the upper component and to the outer side of the lower component. The decorative panel is fabricated of a shiny material. The shiny material has an appearance of chrome.

Further provided is an anti-slip piece 60, 60A. The anti-slip piece is secured to the exterior surface of the top. The anti-slip piece is fabricated of an anti-slip elastomer. In this manner a person slipping is abated when they step on the system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A running board system (10) constituting a vehicle platform for standing upon and for providing a stable step into and from a vehicle comprising, in combination:

an upper component (14)(14A) and a similarly configured lower component (16)(16A), the upper component and the lower component having a common height and a common width and a common length, the common height being from 30 to 40 percent of the common width, the common width being from 15 to 25 percent of the common length;

the upper component having a top (20)(20A) horizontally disposed, the upper component having an inner side (22)(22A) vertically disposed with a lower free end, the upper component having an outer side (24)(24A) vertically disposed with a lower free end;

the lower component having a bottom (28)(28A) horizontally disposed, the lower component having an inner side (30)(30A) vertically disposed with an upper free end, the lower component having an outer side (32)(32A) vertically disposed with an upper free end;

the lower free end of the inner side of the upper component being coupled to the upper free end of the inner side of the lower component, the lower free end of the outer side of the upper component being coupled to the upper free end of the outer side of the lower component thereby forming a cylindrical configuration with an exterior surface and an interior surface with a chamber (36)(36A) there within, the chamber having opposed ends separated by the length;

a support beam (40)(40A) within the chamber extending vertically between the opposed ends of the chamber, the support beam having an upper end adjacent to the top, the support beam having a lower end adjacent to and spaced from the bottom, two U-shaped channels (42)(42A) within the housing extending upwardly from the bottom adjacent to the opposed ends of the chamber;

each U-shaped channel having walls (44)(44A) laterally spaced and forming a space there between, the lower end of the support beam being located within the spaces, two slots (46)(46A) in the bottom between the walls, two bolts (48)(48A) extending through the two slots respectively, each bolt having a lower end extending below the bottom for coupling to the vehicle, each bolt having an upper end within the space and held in place by the support beam;

a plurality of bulkheads (52) within the chamber between the bolts and contacting the top and the bottom to provide added strength to the system, the upper component and the lower component and the support beam and the U-shaped channel being fabricated of a rigid material;

a decorative panel (56) (56A) coupled to the outer side of the upper component and to the outer side of the lower component, the decorative panel being fabricated of a shiny material with an appearance of chrome; and an anti-slip piece (60)(60A) secured to the exterior surface of the top, the anti-slip piece being fabricated of an anti slip elastomer to abate a person slipping when stepping on the system.

\* \* \* \* \*